Patented Feb. 10, 1931

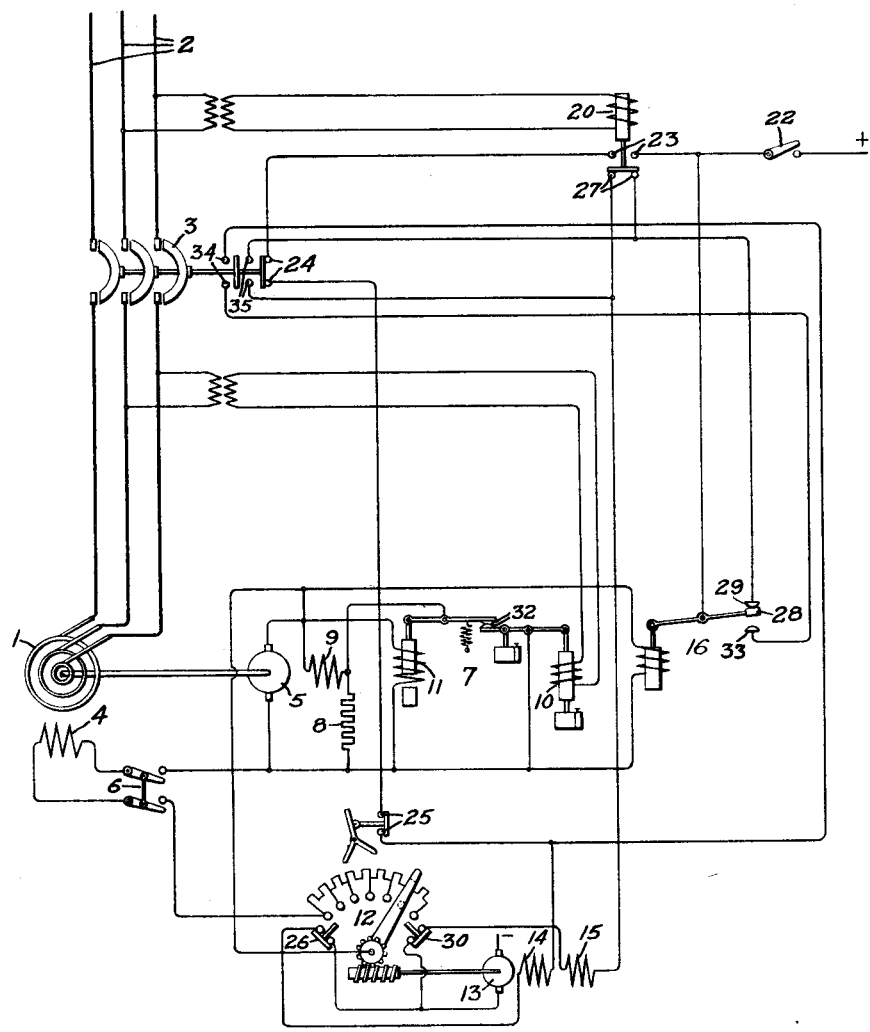

1,792,268

UNITED STATES PATENT OFFICE

HERMAN BANY, OF YEADON, PENNSYLVANIA, ASSIGNOR TO GENERAL ELECTRIC COMPANY, A CORPORATION OF NEW YORK

CONTROL SYSTEM

Application filed October 1, 1928. Serial No. 309,563.

My invention relates to control systems for alternating current machines and its object is to provide an arrangement whereby an alternating current machine is supplied with a predetermined amount of excitation when it is connected to a system which is deenergized and is supplied with a larger amount of excitation when it is connected to a system which is energized.

My invention is particularly applicable to a control system for an alternating current generator which is adapted to be connected to a long transmission line. When such a generator is connected to the transmission line while it is deenergized the charging current of the line may cause the voltage of the generator when it is supplied with its normal no load value of excitation to build up to an excessive value. When, however, the line is energized, the generator may be connected to the transmission line and supplied with its normal no load excitation without an excessive voltage occurring across the generator terminals.

In accordance with my invention I provide an arrangement whereby an alternating current machine is supplied with a relatively small predetermined value of excitation when the machine is connected to a line which is deenergized and with a relatively large amount of excitation when the machine is connected to a line which is energized.

My invention will be better understood from the following description taken in connection with the accompanying drawing which constitutes a single figure and its scope will be pointed out in the appended claims.

Referring to the accompanying drawing which is a diagram of a control system for an alternating current generator embodying my invention, 1 represents an alternator which is arranged to be connected to an alternating current circuit 2 by means of a suitable switch 3. The alternator 1 is provided with a field winding 4 which is adapted to be connected to an exciter 5 by means of a suitable switch 6. As shown in the drawing the exciter is direct connected to the generator 1. The switches 3 and 6 may be controlled in any suitable manner examples of which are well known in the art. Preferably the switches are arranged to be controlled automatically so that when the generator is started the switch 3 is closed when the generator reaches approximately synchronous speed and then the switch 6 is automatically closed by exciting the generator. Such automatic control arrangements are old and well known in the art.

For controlling the voltage of the generator 1 after it is connected to the circuit 2, I provide a voltage regulator 7 of the well known Tirrill type which controls a short circuit around a resistor 8 which is connected in series with the shunt field winding 9 of the exciter. As shown in the drawing the regulator 7 includes an A. C. control magnet 10 which is connected so as to be responsive to the voltage of the generator 1 and a D. C. anti-hunting winding 11 which is responsive to the exciter voltage.

12 represents a motor operated rheostat which is arranged to be connected in series with the exciter 5 and the generator field winding 4 when the switch 6 is closed. As shown in the drawing, the rheostat 12 is arranged to be operated to cut resistance out of the generator field circuit when the armature 13 and the field winding 14 of the rheostat motor are simultaneously energized and to cut resistance into the generator field circuit when the armature 13 and the field winding 15 of the rheostat motor are simultaneously energized. For controlling the normal operation of the motor operated rheostat 12 when the generator 1 is supplying current to the circuit 2, a contact making voltmeter 16, which responds to the exciter voltage, is provided. When the exciter voltage tends to exceed a predetermined value the voltmeter 16 effects the completion of a circuit for the motor of the motor operated rheostat to decrease the amount of resistance in the generator field circuit. When the exciter voltage tends to decrease below a predetermined value the voltmeter 16 effects the completion of a circuit for the motor of the motor operated rheostat to increase the amount of resistance in the generator field circuit.

When the generator 1 supplies current to a long transmission line, the generator at the instant it is placed in operation should be supplied with different amounts of excitation depending upon the condition of the transmission line. If the transmission line is deenergized and the generator is supplied with its normal no load excitation the voltage of the generator may build up to an excessive value before the motor operated rheostat 12 can operate to decrease the generator excitation to the desired value. When, however, the transmission line is energized, it is desirable to have the rheostat 12 in its no load voltage position so that the generator may be supplied with its no load value of excitation as soon as it is placed in operation.

In accordance with my invention I provide a voltage relay 20 which is responsive to the voltage of the circuit 2, and which is arranged to control the operation of motor operated rheostat 12 so that when the generator 1 is not in operation the rheostat is adjusted to a position whereby all of the resistance of the rheostat is inserted in series with the generator field circuit when the generator is placed in operation at a time when the circuit 2 is deenergized and whereby only a portion of the resistance of the rheostat is inserted in series with the generator field circuit when the generator is placed in operation at a time when the circuit 2 is energized.

22 represents a master control switch which when closed permits the motor operated rheostat 12 to be controlled by the voltage relay 20 and by the voltmeter 16.

The operation of the arrangement shown in the drawing is as follows. While the generator 1 is shut down, the switch 22 is closed and the circuit 2 is energized so that the contacts 23 of relay 20 are closed; a circuit is completed for the motor operated rheostat 12 so that only a portion of the resistance of the rheostat is arranged to be connected in the generator field circuit when the switch 6 is closed during the starting operation of the generator. This circuit is from one side of a suitable control circuit through switch 22, contacts 23 of relay 20, auxiliary contacts 24 on switch 3, contacts 25 on rheostat 12 which are closed if the rheostat is in a position to insert more than a predetermined amount of resistance in the generator field circuit, field winding 14 of the rheostat motor, limit switch 26, armature winding 13 of the rheostat motor to the other side of the control circuit. Preferably, the contacts 25 are arranged to be opened whenever the rheostat 12 is in the position it normally occupies when the generator is in operation and is supplying substantially no current at normal voltage. The above traced circuit remains completed until the rheostat 12 is adjusted to the desired position and the contacts 25 are open.

If the circuit 2 is deenergized so that contacts 27 of the relay 20 are closed while the generator is shut down, a circuit is completed for the motor operated rheostat 12 so that it is adjusted to a position whereby all of the resistance thereof is arranged to be connected in the generator field circuit when the generator is placed in operation. This circuit is from one side of the control circuit through switch 22, contacts 28 and 29 of the voltmeter 16 which will be closed since the exciter voltage will be zero when the generator is shut down, contacts 27 of relay 20, field winding 15 of the rheostat 12, limit switch 30, which is opened when all of the rheostat has been cut in, armature winding 13 of the rheostat motor to the other side of the control circuit.

Therefore, it will be observed that when the generator is shut down the rheostat is either in a position where all of the resistance of the rheostat will be connected in series with the generator field circuit when the switch 6 is closed or in a position whereby not more than a predetermined portion of the resistance of the rheostat will be connected in series with the generator field circuit when the switch 6 is closed. That is the rheostat arm in the arrangement shown in the drawing will either be in its extreme right hand position or in or to the left of the position in which the contacts 25 are opened.

When the generator 1 is placed in operation it is started from rest and when it reaches a predetermined speed the switches 3 and 6 are successively closed, preferably automatically, in any suitable manner examples of which are well known in the art. While the generator is coming up to speed the exciter voltage will be building up since the contacts 32 of the regulator 7 are closed due to the fact that the coils of both of the magnets 10 and 11 are deenergized. If the exciter voltage builds up fast enough so that it tends to exceed a predetermined value the magnet 11 opens contact 32 and limits in a well known manner the exciter voltage to a predetermined value. Also, if the exciter voltage builds up fast enough so that it reaches a sufficient value to cause the voltmeter 16 to open its contacts 28 and 29 and close its contacts 28 and 33 before the switches 3 and 6 are closed a circuit is completed for armature 13 and field winding 14 of the rheostat motor to effect a decrease in the amount of resistance in circuit as soon as the switch 3 is closed. After the switch 3 is closed to connect the generator to the line the regulator 7 operates in a manner well known in the art to maintain the generator voltage at the desired value. After the switch 3 closes the position of the rheostat 12 depends upon the position of the voltmeter 16. If the exciter voltage is too high a circuit is completed for the windings 13 and 14 of the rheostat motor, through contacts 28 and 33 and auxiliary contacts 34 on the switch 3 so that the amount of resistance in the generator field circuit is decreased and, therefore, a lower exciter voltage is needed to maintain the desired generator voltage. If the exciter voltage is too low a circuit is completed for the winding 13 and 15 of the rheostat motor through contacts 28 and 29 of the voltmeter 16 and the auxiliary contacts 35 so that amount of resistance in the generator field circuit is increased and, therefore, a larger exciter voltage is needed to maintain the desired generator voltage.

While I have, in accordance with the patent statutes, shown and described my invention as applied to a particular system and as embodying various devices diagrammatically indicted, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, an electric circuit, a generator, a switch for connecting said generator to said circuit, an exciter for said generator, a rheostat, means for connecting said rheostat in series between the exciter and the generator field winding, electromagnetic means arranged when energized to effect the operation of said rheostat so as to decrease the amount of resistance in circuit, means responsive to voltage of said circuit, and a control circuit for said electromagnetic means controlled by said switch and said voltage responsive means and said rheostat so that it is completed only when the voltage of said electric circuit is above a predetermined value, the switch is open and more than a predetermined amount of said rheostat is connected in the generator field circuit.

2. In combination, an electric circuit, a generator, a switch for connecting said generator to said circuit, an exciter for said generator, a rheostat, means for connecting said rheostat in series between the exciter and the generator field winding, electromagnetic means arranged when energized to effect the operation of said rheostat so as to decrease the amount of resistance in circuit, means responsive to voltage of said circuit, a control circuit for said electromagnetic means controlled by said switch and said voltage responsive means and said rheostat so that it is completed only when the voltage of said electric circuit is above a predetermined value, the switch is open and more than a predetermined amount of said rheostat is connected in the generator field circuit, another control circuit for said electromagnetic means, and means responsive to the voltage of said exciter for completing said last mentioned control circuit when the exciter voltage exceeds a predetermined value.

3. In combination, an electric circuit, a generator, a switch for connecting said generator to said circuit, an exciter for said generator, a rheostat means for connecting said rheostat in series between the exciter and the generator field winding, means responsive to the exciter voltage, means responsive to the voltage of said circuit, electromagnetic means arranged when energized to effect the operation of said rheostat so as to increase the amount of resistance thereof in circuit, and a control circuit for said last mentioned electromagnetic means controlled by said exciter voltage responsive means and said load circuit voltage responsive means so that it is completed only when the load circuit voltage and exciter voltage are below predetermined values.

4. In combination, a generator having a field circuit, an exciter for supplying current to said field circuit, an adjustable rheostat in said field circuit, regulating means responsive to the voltage of said generator for controlling the voltage of said exciter, means responsive to the voltage of said exciter for controlling the adjustment of said rheostat, a load circuit, means for connecting said generator to said load circuit, and means responsive to the voltage of said load circuit for controlling the adjustment of said rheostat when said generator is disconnected from said load circuit.

5. In combination, a generator having a field circuit, an exciter for supplying current to said field circuit, an adjustable rheostat in said field circuit, regulating means responsive to the voltage of said generator for controlling the voltage of said exciter, a load circuit, switching means for connecting said generator to said load circuit, means controlled by said connecting means and the voltage of said load circuit for controlling the adjustment of said rheostat in accordance with the load circuit voltage when said generator is disconnected from said load circuit.

6. In combination, a generator having a field circuit, an exciter for supplying current to said field circuit, an adjustable rheostat in said field circuit, regulating means responsive to the voltage of said generator for controlling the voltage of said exciter, a load circuit, switching means for connecting said generator to said load circuit, means controlled by said connecting means and the voltages of said exciter and load circuit for controlling the adjustment of said rheostat in accordance with the load circuit voltage when said generator is disconnected from said load circuit and in accordance with the exciter voltage when said generator is connected to said load circuit.

7. In combination, a transmission line requiring a relatively large charging current, a synchronous dynamo electric machine, switching means for connecting said machine to said line, an adjustable rheostat in the field circuit of said machine, and means controlled by said switching means and the voltage of said line for varying the position of said rheostat in accordance with the voltage of said line while said machine is disconnected from said line and in accordance with the excitation of said machine while said machine is connected to said line.

In witness whereof, I have hereunto set my hand this twenty-sixth day of September, 1928.

HERMAN BANY.